US008593123B2

(12) United States Patent
Chen et al.

(10) Patent No.: US 8,593,123 B2
(45) Date of Patent: Nov. 26, 2013

(54) SWITCHING VOLTAGE REGULATORS WITH HYSTERETIC CONTROL FOR ENHANCED MODE-TRANSITION SPEED AND STABILITY

(75) Inventors: Jia Chen, Shanghai (CN); Bin Shao, Shanghai (CN)

(73) Assignee: Analog Devices, Inc., Norwood, MA (US)

( * ) Notice: Subject to any disclaimer, the term of this patent is extended or adjusted under 35 U.S.C. 154(b) by 321 days.

(21) Appl. No.: 12/979,167

(22) Filed: Dec. 27, 2010

(65) Prior Publication Data

US 2012/0161728 A1 Jun. 28, 2012

(51) Int. Cl.
*G05F 1/40* (2006.01)

(52) U.S. Cl.
USPC .......................................... 323/284; 323/282

(58) Field of Classification Search
USPC ........ 363/16–20, 21.05, 21.13, 21.15, 41, 89, 363/98, 56.03, 127; 323/207, 222, 323/282–290, 272–276, 266, 267
See application file for complete search history.

(56) References Cited

U.S. PATENT DOCUMENTS

| 4,384,321 A * | 5/1983 | Rippel .......................... 363/124 |
| 5,568,044 A | 10/1996 | Bittner |
| 5,742,151 A | 4/1998 | Hwang ......................... 323/222 |
| 5,798,635 A | 8/1998 | Hwang et al. ................. 323/222 |
| 5,912,552 A | 6/1999 | Tateishi |
| 6,304,066 B1 * | 10/2001 | Wilcox et al. ................. 323/282 |
| 6,348,779 B1 | 2/2002 | Sluijs ............................ 323/222 |
| 6,969,978 B2 * | 11/2005 | Dening ......................... 323/282 |
| 6,972,548 B2 | 12/2005 | Tzeng et al. .................. 323/282 |
| 7,030,596 B1 | 4/2006 | Salerno et al. |
| 7,045,992 B1 | 5/2006 | Silva et al. .................... 323/222 |
| 7,109,688 B1 | 9/2006 | Chiu et al. .................... 323/222 |
| 7,109,695 B2 | 9/2006 | King ............................. 323/283 |
| 7,230,408 B1 | 6/2007 | Vinn et al. .................... 323/273 |
| 7,248,027 B2 | 7/2007 | Ribeiro et al. ................ 323/282 |
| 7,358,711 B2 | 4/2008 | Sutardja et al. ............... 323/283 |

(Continued)

OTHER PUBLICATIONS

"DC-DC Controllers Use Average-Current-Mode Control for Infotainment Applications", Application Note 3939, Maxim Integrated Products, Sunnyvale, Ca., Nov. 22, 2006, pp. 1-9.

(Continued)

*Primary Examiner* — Rajnikant Patel
(74) *Attorney, Agent, or Firm* — Schwegman Lundberg & Woessner, P.A.

(57) ABSTRACT

Switching voltage regulator embodiments are provided with hysteretic control to thereby switch between pulse-width modulation and pulse-frequency modulation operational modes. The switching is in response to different levels of an error voltage $V_{err}$ in the feedback loop of voltage regulators. The hysteretic control is configured to provide a dc hysteretic response to changes in the error voltage $V_{err}$ and also an ac hysteretic response to these changes. These two responses can be independently set to thereby enhance operational speed of the voltage regulators and also enhance immunity to transient noise signals that are generated by the mode switching. The voltage regulator embodiments facilitate instant return from the pulse-frequency modulation operational mode to the pulse-width modulation operational mode so that the stability of the feedback control of the regulator is enhanced. This feature is especially useful when the feedback loop is configured to include current-mode control as it minimizes the time duration in which the feedback loop operates in a voltage-mode control. The instant return insures that the feedback loop is immediately returned to the greater stability of the current-mode control.

20 Claims, 3 Drawing Sheets

(56) References Cited

U.S. PATENT DOCUMENTS

| | | | |
|---|---|---|---|
| 7,382,114 B2 | 6/2008 | Groom | 323/271 |
| 7,576,527 B1* | 8/2009 | Zhang et al. | 323/284 |
| 7,737,643 B2* | 6/2010 | Lys | 315/291 |
| 8,085,024 B2* | 12/2011 | Prodic et al. | 323/283 |
| 8,138,731 B2* | 3/2012 | Chen | 323/272 |

OTHER PUBLICATIONS

Chen, Jingdong, "Determine Buck Converter Efficiency in PFM Mode", Power Electronics Technology, Sep. 2007, pp. 28-33.

\* cited by examiner

US 8,593,123 B2

SWITCHING VOLTAGE REGULATORS WITH HYSTERETIC CONTROL FOR ENHANCED MODE-TRANSITION SPEED AND STABILITY

BACKGROUND OF THE INVENTION

1. Field of the Invention

The present invention relates generally to switching converters.

2. Description of the Related Art

Switched-mode voltage regulators provide superior voltage conversion efficiency because they regulate an output voltage with transistor switches that are either on or off so that they never operate in the linear region in which both current and voltage are nonzero. Because at least one of transistor current and voltage is therefore always close to zero, dissipation is greatly reduced.

These regulators often operate in two different operational modes. When current demand is high, they preferably operate in a pulse-width modulation mode and, when current demand is low, they are preferably switched to a pulse-frequency modulation operational mode. The latter mode enhances operational efficiency because it eliminates switching losses in the transistor switches. It has been found, however, that transitioning between these operational modes is slow, is sensitive to transient noise signals, and, often prone to circuit instabilities.

BRIEF SUMMARY OF THE INVENTION

The present invention is generally directed to voltage regulator embodiments that have enhanced mode-transition speed and stability. The drawings and the following description provide an enabling disclosure and the appended claims particularly point out and distinctly claim disclosed subject matter and equivalents thereof.

DETAILED DESCRIPTION OF THE INVENTION

FIGS. 1-4B illustrate switching voltage regulator embodiments that provide hysteretic control to switch between a pulse-width modulation operational mode and a pulse-frequency modulation operational mode. The switching is in response to different levels of an error voltage $V_{err}$ in a regulator feedback loop. The hysteretic control is configured to provide a dc hysteretic response to changes in the error voltage $V_{err}$ and also an ac hysteretic response to these changes. These two responses can be independently set to thereby enhance operational speed of the voltage regulators and also enhance immunity to transient noise signals that are generated by the mode switching.

The voltage regulator embodiments facilitate instant return from the pulse-frequency modulation operational mode to the pulse-width modulation operational mode so that the stability of the feedback control of the regulator is enhanced. This feature is especially useful when the feedback loop is configured to include current-mode control as it minimizes the time duration in which the feedback loop operates in a voltage-mode control. The instant return insures that the feedback loop is immediately returned to the greater stability of the current-mode control.

Figures 1, 4A, 4B:
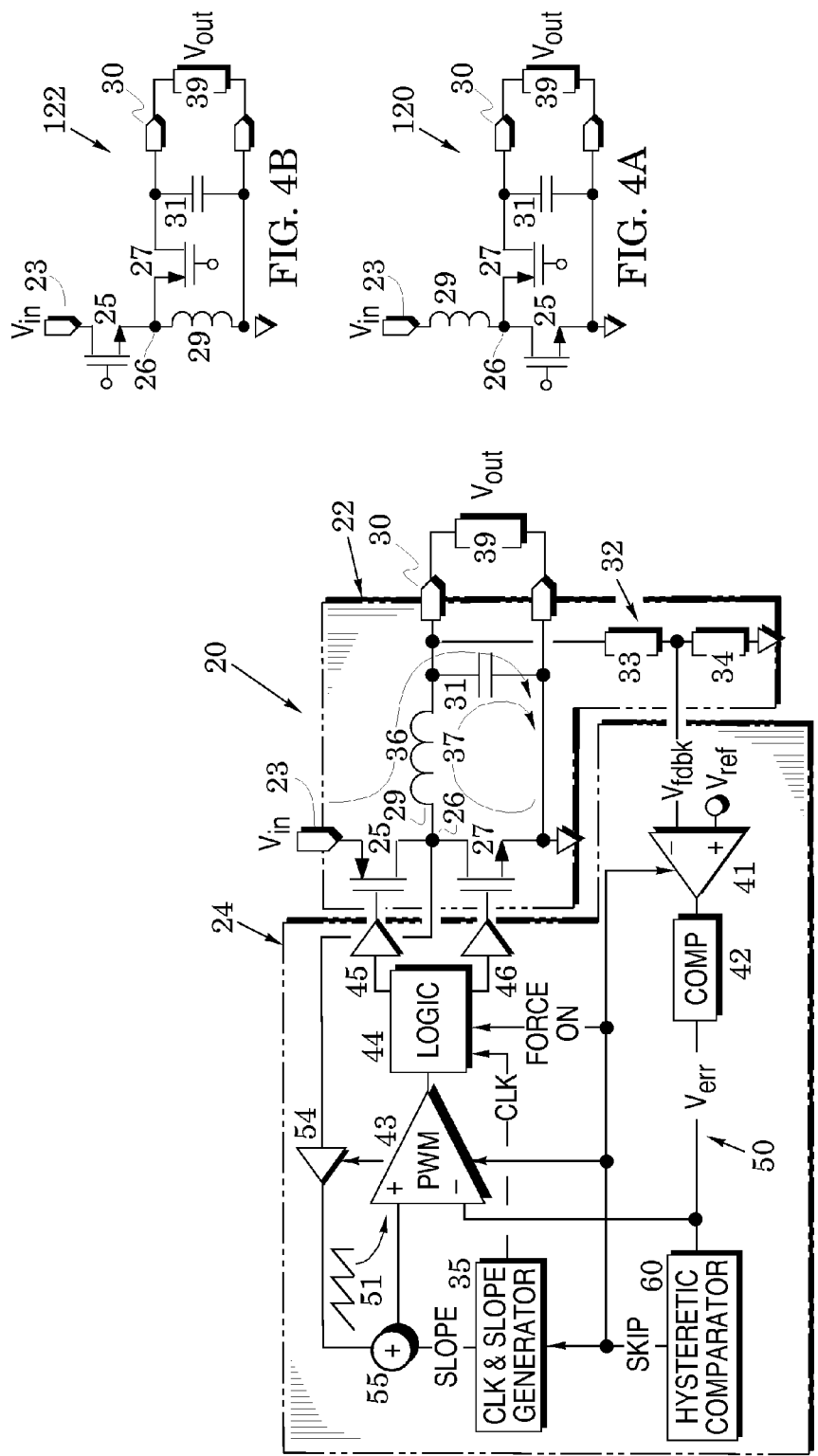
FIG. 1 is a schematic of a voltage regulator embodiment.
FIGS. 4A and 4B are schematics of different output stage embodiments for use in the voltage regulator of FIG. 1.

In particular, FIG. 1 illustrates a switching voltage regulator embodiment 20 that comprises an output stage 22 and a feedback controller 24. The output stage includes a first transistor 25 coupled between an input port 23 and a swinging node 26, a second transistor 27 coupled between the swinging node and circuit ground, and an inductor 29 coupled between the swinging node 26 and an output port 30. A capacitor 31 is coupled across the output port and a voltage divider 32 is coupled to the top of the output port. The voltage divider is formed by first and second impedances such as first and second resistors 33 and 34. In a regulator embodiment, the transistors may be metal-oxide-semiconductor, field effect (MOSFET) transistors and, if so, the drains of the transistors are preferably coupled to the swinging node 26.

The output stage 22 operates at a clock rate determined by a clock signal (CLK) from a clock and slope generator 35. In operation of the output stage 22, the first transistor 25 is switched on (the second transistor is off) for a first time span that initiates each clock period to bring the swinging node up (virtually) to the input port 23 so that a first current 36 flows from an input voltage $V_{in}$ at the input port 23 and through the first transistor 25, the inductor 29 and the capacitor 31. In a second time span covering the remainder of each clock period, the second transistor 27 is switched on (the first transistor is now off) so that a second current 37 flows through the second transistor 25, the inductor 29 and the capacitor 31. Energy is thus stored in the inductor during the first time span and energy is transferred to the capacitor during the second time span.

The duty cycle of the output stage 22 is the ratio of the first time span to the clock period. The feedback controller 24 is configured to vary the duty cycle as required to maintain an output voltage $V_{out}$ across a load 39 that is coupled to the output port 30. If the load is a light load (i.e., a large impedance) drawing a small current, the feedback controller will reduce the duty cycle to maintain the output voltage $V_{out}$ and, if the load is a heavy load (i.e., a small impedance) drawing a large current, the feedback controller will increase the duty cycle as required to maintain the output voltage $V_{out}$. In an exemplary output stage, the input voltage $V_{in}$ could be 2.3 volts, the output voltage $V_{out}$ could be 0.8 volt, and the output current through the load 39 as high as 3 amperes.

In the regulator embodiment 20, the feedback controller 24 includes a loop differential amplifier 41, a loop compensation 42, a pulse-width modulation (PWM) comparator 43, switching logic 44 and first and second drivers 45 and 46 that are respectively arranged in series between the voltage divider 32 and the input gates of the first and second transistors 25 and 27 to thus establish a feedback loop 50. A reference voltage $V_{ref}$ is applied to the positive input of the loop differential amplifier 41.

In operation of the feedback loop 50, the voltage divider 34 provides a feedback voltage $V_{fdbk}$ which is compared to the reference voltage and the difference forms (in the differential amplifier 41) an error voltage $V_{err}$. The loop compensation 42 is configured (generally with capacitors and resistors) to shape the error voltage over frequency in compensation ways well known to establish loop stability. In a voltage mode control embodiment of the voltage regulator 20, a sawtooth waveform 51 is provided to the positive input of the PWM comparator 43 so that, when the error voltage $V_{err}$ is compared to the sawtooth, a pulse train with a train duty cycle is produced. In response, the logic 44 and drivers 45 and 46 are configured to drive the first and second transistors 25 and 27 to produce an output-stage duty cycle that corresponds to the train duty cycle.

The feedback loop 50 is arranged so that an increase in the output voltage $V_{out}$ will cause the duty cycle of the pulse train from the PWM detector to decrease and the resultant decrease in the time duration of the first current 36 brings the output voltage $V_{out}$ back down to the level set by the voltage divider 32. In a similar manner, a decrease in the output voltage $V_{out}$ causes the duty cycle of the pulse train from the PWM detector to increase and the resultant increase in the time duration of the first current 36 brings the output voltage $V_{out}$ back up to the level set by the voltage divider 34. The feedback loop 50 thus decreases the duty cycle when the load 24 constitutes a light load and increases the duty cycle when it is a heavy load.

The operation described above may be considered to be a voltage-mode control. To facilitate a current-mode control embodiment of the voltage regulator 20, a current sense amplifier 54 is connected to amplify the voltage across the inductor 29 to thereby provide a ramp signal which replaces the sawtooth waveform 51. It is noted, however, that in another regulator embodiment, the ramp signal can be originated with a small resistor placed in series with the first transistor 25. In any of these current-mode control embodiments, the generated ramp signal has a slope determined by the rising current through the inductor 29 each time the first transistor 25 is switched on. When the amplitude of the ramp signal into the PWM comparator 43 exceeds the error voltage $V_{err}$, the first transistor 25 is turned off and the second transistor 27 turned on for the remainder of the clock period.

Essentially, a fast current feedback loop is thus formed through the current sense amplifier 54 and PWM comparator 43 and this current loop is nested within the slower voltage feedback loop formed through the loop differential amplifier 41, loop compensation 42 and PWM comparator 43. It has generally been found that current mode control simplifies the loop compensation 42, enhances the response time of the feedback loop 50, and enables the voltage regulator 20 to respond more quickly to changes in the input voltage $V_{in}$.

It has also been found that the current feedback loop may tend to instability when the duty cycle of the first transistor 25 becomes large. It has further been found that this tendency can be substantially controlled by adjusting the slope of the ramp signal provided to the PWM comparator 43. Accordingly, the clock and slope generator 35 of FIG. 1 is configured to provide a slope signal to a summer 55 where it is added to the ramp signal from the current sense amplifier 54.

The slope signal is simply another voltage ramp which permits the system 20 to selectively alter (in the summer 55) the slope of the final voltage ramp that is provided to the PWM comparator 43. The slope can thus be adjusted to best enhance the stability of the current and voltage feedback loops of the switching voltage regulator 20. Essentially, the slope signal adds a second degree of freedom in insuring the stability of the voltage regulator 20.

The voltage-mode operation and the current-mode operation described above may be considered to be different embodiments of PWM operational modes. In the switching voltage regulator 20 of FIG. 1, the first and second transistors 25 and 27 are either on or off during each clock period so that the switching losses are quite low because the on resistance of a MOSFET transistor is quite small. Other power losses (e.g., induction loss) are also small so that the efficiency is high. In particular, the efficiency is superior to that of linear voltage regulators in which a control transistor is constantly on, i.e., not switched.

When the load is very light (i.e., the load 24 has a large impedance), however, the switching losses become a major portion of the total losses and it becomes desirable enter a pulse-frequency modulation (PFM) operational mode in which the switching action of the regulator 20 is turned off to enhance its efficiency during these load conditions. Accordingly, the voltage regulator 20 also includes a hysteretic comparator 60 which is configured to provide a skip signal when the error voltage $V_{err}$ from the loop differential amplifier 41 (via the compensation 42) drops below a predetermined first threshold voltage. The skip signal is provided to turn off the clock and slope generator 35, turn off the PWM comparator 43, turn off the current sense amplifier 54, and substantially reduce the current drain of the feedback differential amplifier 41. The voltage regulator 20 thus enters a PFM mode of operation during which the first and second transistors 25 and 27 are biased off to thereby substantially reduce the current drain of the voltage regulator 20.

When current drain to the load 24 subsequently causes the error voltage $V_{err}$ from the loop differential amplifier 41 to rise above a predetermined second threshold level, the hysteretic comparator 60 changes the level of the skip signal which turns on the clock and slope generator 35, the PWM comparator 43, the current sense amplifier 54, and all currents of the feedback differential amplifier 41. The voltage regulator 20 thus returns to the PWM mode of operation during which the first transistor and second transistors 25 and 27 are switched in accordance with a duty cycle determined by the error voltage $V_{err}$. This level of the skip signal from the hysteretic comparator 60 may now be termed a force on signal which is applied to the logic 44 to instantly turn on the first transistor 25. The output stage 22 returns to the PWM operation described above and the force on signal insures that an initial current (36 in FIG. 1) of this operation is instantly provided to the inductor 29.

Figure 2:
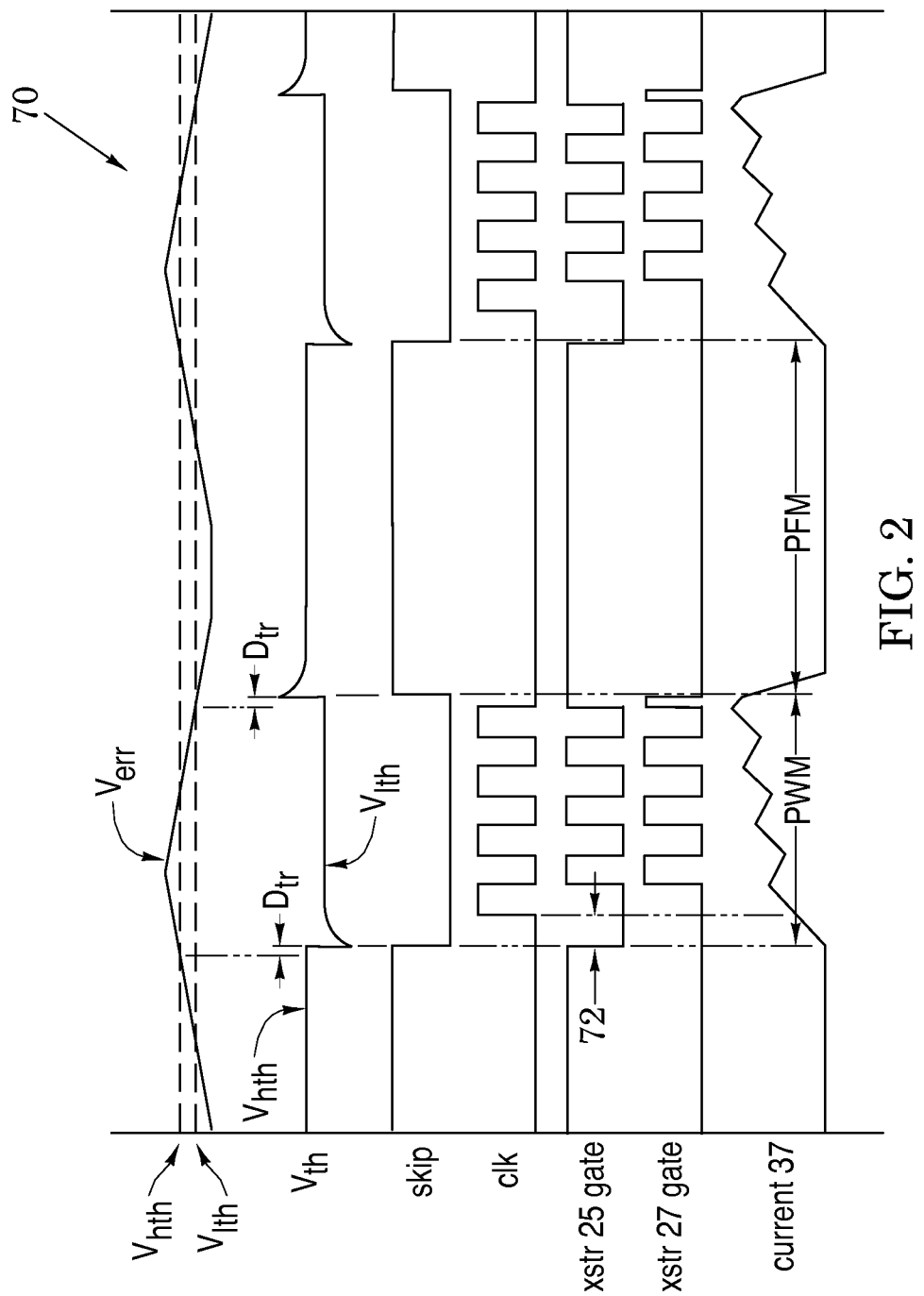
FIG. 2 is a diagram that illustrates exemplary currents and voltages in operation of the regulator of FIG. 1.

The graph 70 of FIG. 2 illustrates various waveforms in the voltage regulator 20 as it transitions between its PWM and PFM operational modes. Before describing the operations of this graph, however, it will be instructive to first describe operation of the hysteretic comparator 60. Accordingly, attention is now directed to FIG. 3A which illustrates a hysteretic comparator embodiment 80. As shown, it includes a comparator 81 which drives an inverter 82 to generate the skip signal of FIG. 1. A first switch 84 is arranged to couple a high threshold voltage $V_{hth}$ to the negative input of the comparator 81 and this first switch is closed when the output of the inverter 82 is high. A second switch 85 is arranged to couple a low threshold voltage $V_{hth}$ to the negative input of the comparator and this second switch is closed when the output of the comparator 81 is high. Finally, a capacitor 86 is coupled from the output of the inverter 82 back to a summer 87 positioned between the switches and the negative input of the comparator.

Figure 3C:
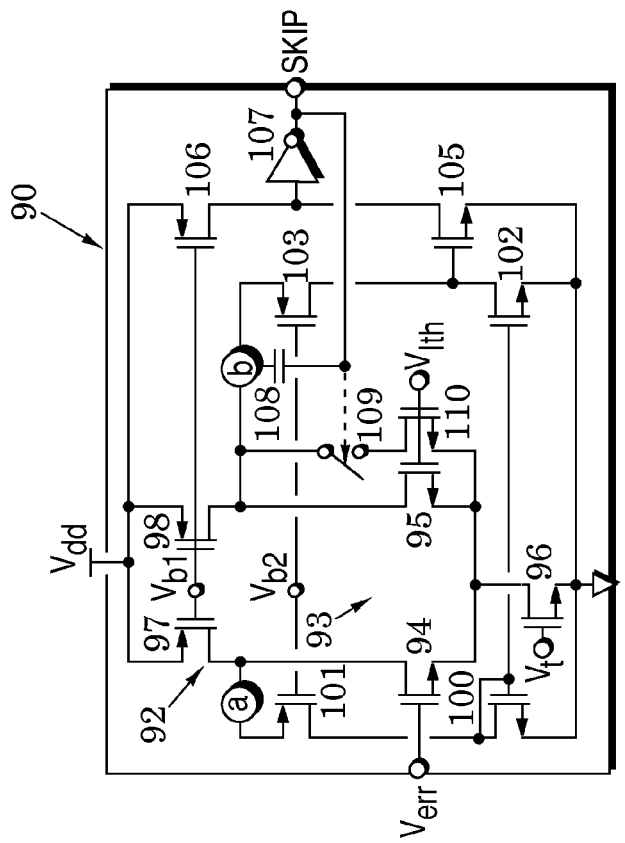
FIG. 3C is a schematic of another embodiment of the hysteretic generator of FIG. 1.
Figure 3B:
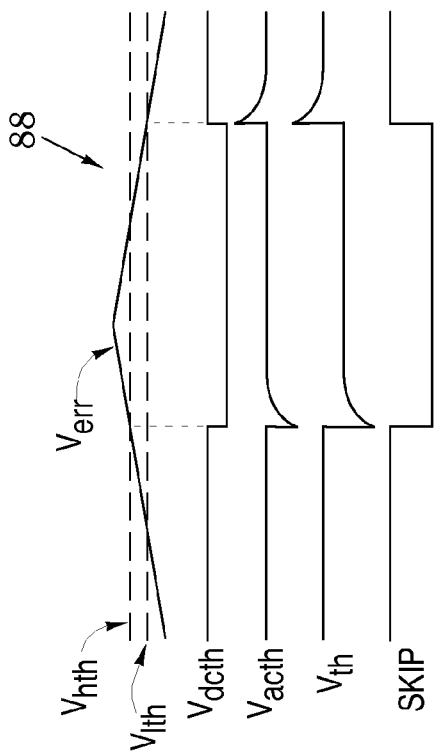
FIG. 3B is a diagram that illustrates signal levels in operation of the hysteretic generator of FIG. 3A.

FIG. 3B is a graph 88 that illustrates an exemplary operation of the hysteretic comparator 80 in which the error voltage $V_{err}$ in the voltage regulator 20 of FIG. 1 is applied to the positive input of the comparator 81. To facilitate this description, it is assumed that the error voltage $V_{err}$ is shown to initially ramp up and then subsequently ramp down. It is noted that this movement is the inverse of that of the output voltage $V_{out}$ at the output port 30 in FIG. 1. Exemplary relative positions of the high threshold voltage $V_{hth}$ and the low threshold voltage $V_{hth}$ are shown in broken lines in FIG. 3B.

Figure 3A:
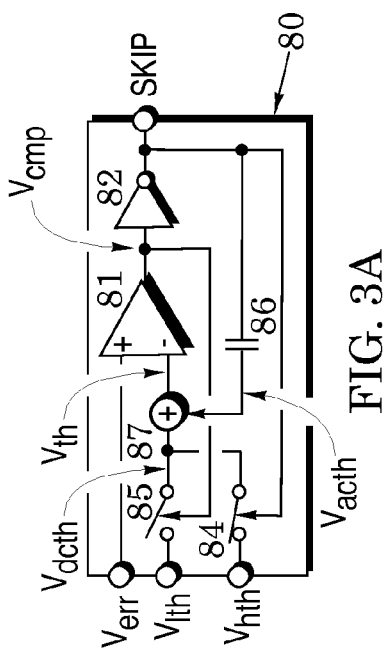
FIG. 3A is a schematic of a hysteretic generator embodiment for use in the voltage regulator of FIG. 1.

Because the error voltage $V_{err}$ is initially lower than both threshold voltages $V_{hth}$ and $V_{hth}$, the skip signal will be high as shown in FIG. 3B. Because the switch 84 is closed, the dc threshold voltage $V_{dcth}$, shown in FIG. 3A, is initially high as shown in the graph 88. When the error voltage $V_{err}$ rises above the high threshold voltage $V_{hth}$, the output of the comparator 81 goes high to thereby close the second switch 85. And the output of the inverter 82 goes low (as shown by the skip signal in FIG. 3B) to thereby open the first switch 84.

At this point, the dc threshold voltage $V_{dcth}$ transitions from a high state to a low state. When the error voltage $V_{err}$ subsequently drops below the low threshold voltage $V_{lth}$, the output of the comparator 81 goes low to thereby open the second switch 85. The output of the inverter 82 goes high (as shown by the skip signal in FIG. 3B) to thereby close the first switch 84. At this point, the dc threshold voltage $V_{dcth}$ transitions back to its high state.

Because the voltage across the capacitor 86 cannot instantly change, the ac threshold voltage $V_{acth}$ applied to the summer 87 pulses low when the skip signal drops and pulses high when the signal rises. Each pulse then decays with a time constant determined by the capacitance of the capacitor 86 and the circuit resistance coupled to this capacitor. The resulting ac threshold voltage $V_{acth}$ is shown in FIG. 3B. This signal sums with the dc threshold voltage $V_{dcth}$ to form the threshold voltage $V_{th}$ at the negative input to the comparator 81.

A high gain comparator is very sensitive to the voltage levels at its inputs. If transient signals (often called "noise") are coupled to either of these inputs (e.g., across various circuit lines and structures), the comparator output may temporarily be in error, i.e., the output may "bounce". To reduce the chance that these comparator errors occur, the distance between the threshold voltages $V_{hth}$ and $V_{hth}$ can be increased. Although this may eliminate transient errors in the comparator 80, it decreases the comparator's sensitivity to the error voltage $V_{err}$ and this may degrade the action of the voltage regulator 20 of FIG. 1.

Such compromises are not required in the hysteretic comparator 80 because the threshold voltage $V_{th}$ momentarily pulses negatively and positively as shown in FIG. 3B to guard against transient signals. With this transient guard set in place, the threshold voltages $V_{hth}$ and $V_{hth}$ can then be independently set at levels that enhance operation of the voltage regulator 20. The hysteretic comparator 80 thus provides both dc and ac hysteresis and independent control of each wherein it is noted that hysteresis is the phenomenon wherein a system's reaction to a change in a parameter is dependent upon its past reaction to such a change.

FIG. 3C illustrates another embodiment 90 of the hysteretic comparator. In this embodiment, a differential amplifier 92 is formed by a differential pair 93 of transistors 94 and 95 that are positioned to receive a tail current from a current transistor 96 (biased by a tail voltage $V_t$) and drive load transistors 97 and 98 that are biased by a first bias voltage $V_{b1}$. The transistor 95 receives a low threshold voltage $V_{lth}$ at its gate. A diode-coupled transistor 100 is drain-coupled to a current transistor 101 whose source is coupled to one side of the differential pair 93 and whose gate is coupled to a second bias voltage $V_{b2}$. Another transistor 102 is gate-coupled to the transistor 100 and drain-coupled to a current transistor 103 whose source is coupled to the other side of the differential pair 93 and whose base is coupled to the second bias voltage $V_{b2}$.

A current transistor 106 has its gate coupled to receive the first bias voltage $V_{b1}$ and is drain-coupled to a transistor 105 whose gate is driven by the drain of the transistor 102. The drains of transistors 105 and 106 drive an inverter 107 that delivers the SKIP signal. A capacitor 108 is coupled between the output of the inverter 107 and the drain of the transistor 95. A second transistor 110 is gate-coupled to the transistor 95 and a switch 109 is coupled between the drain of this transistor and the drain of the transistor 95. To enhance an operational description, sources of the transistors 101 and 103 are shown as circuit nodes a and b.

When the error voltage $V_{err}$ is below the low threshold voltage $V_{lth}$, the circuit node a swings above the second bias voltage $V_{b2}$ and the circuit node b swings below this voltage so that transistor 101 is biased on and transistor 103 is biased off. Diode-coupled transistor 100 is turned on so that the gate of transistor 105 is low and, accordingly, this transistor is off. Current from transistor 106 takes the input of the inverter 107 high so that the SKIP signal is low and this signal closes the switch 109.

The transistors 95 and 110 are now coupled in parallel to form a combined transistor larger than the transistor 94. In order to turn transistor 94 on the error voltage $V_{err}$ must now swing higher than the low threshold voltage $V_{lth}$. In essence, there is now a high threshold voltage $V_{hth}$ just as in the hysteretic comparator 80 of FIG. 3A. When the error voltage $V_{err}$ is above the high threshold voltage $V_{hth}$, the circuit node a swings below the first bias voltage $V_{b1}$ and the circuit node b swings above this voltage so that transistor 101 is biased off and transistor 103 is biased on. Gate-coupled transistor 102 is turned off so that the gate of transistor 105 is driven high and this transistor is on. The input of the inverter 107 is thus pulled low so that the SKIP signal is high and this signal opens the switch 109.

As the SKIP signal goes low and subsequently goes high, the node b is momentarily pulsed low and then momentarily pulsed high. This ac hysteresis insures that the transistor 103 will be immune to noise signals in the voltage regulator. The action of the hysteretic comparator 90 is thus seen to be similar to that of the hysteretic comparator 80 of FIG. 3A. It is noted that the dc hysteresis can be adjusted by setting the relative sizes of the transistors 95 and 110 and this setting is independent of the ac hysteresis which is a function of the size of the capacitor 108.

Attention is now returned to the graph 70 of FIG. 2 which shows the error voltage $V_{err}$ plot, the threshold voltage $V_{th}$ plot, and the skip signal plot of FIG. 3B. The threshold plot shows the effective threshold signals that are developed by the second transistor 110 in the hysteretic comparator 90 of FIG. 3C (or that are provided in the hysteretic comparator 80 of FIG. 3A). As shown, there may be a small transfer delay $D_{tr}$ before the transitions occur between the low threshold voltage $V_{lth}$ and the high threshold voltage $V_{hth}$. The PFM mode is commanded by the high state of the skip signal. When the skip signal drops, the clock is initiated and the PWM operational mode is resumed. However, to insure that the operation resumes immediately, the force on signal (the inverse of the skip signal) is applied to the logic 43 of FIG. 1 so that the transistor 25 gate signal of FIG. 2 is immediately low (i.e., during the time period 72 in FIG. 2) to thereby immediately turn on the first transistor 25 of FIG. 1. After that, the gate signals of the first and second transistors 25 and 27 turn on the transistor 25 for an initial portion of each clock cycle and turn on the transistor 27 for the remaining portion of each clock cycle.

As shown in FIG. 2, the current 37 through the inductor 29 of FIG. 1 begins to immediately build up during the time period 72 as shown in the lower plot of the graph 70. The current 37 then increases further during successive clock cycles. When the error voltage $V_{err}$ again drops below the low threshold voltage $V_{lth}$, the skip signal is initiated and the switching voltage regulator embodiment 20 returns to the PFM operational mode.

Although the output stage 26 of FIG. 1 is arranged to form a buck switching converter, the control embodiments may be extended to other switching converter arrangements such as the boost switching converter 120 of FIG. 4A and the buck-boost switching converter 122 of FIG. 4B that include the reference numbers used in FIG. 1. It will be noted that the second transistor 27 and the inductor 29 of FIG. 1 swap positions in the buck-boost converter 122 of FIG. 4B. It will be further noted that the first transistor 25 and inductor 29 of FIG. 4B swap positions in the boost converter 120 of FIG. 4A.

The embodiments of the invention described herein are exemplary and numerous modifications, variations and rearrangements can be readily envisioned to achieve substantially equivalent results, all of which are intended to be embraced within the spirit and scope of the appended claims.

We claim:

1. A voltage regulator, comprising:
    an output stage having an inductor, an output capacitor, a first transistor coupled between an input port and a swinging node, and a second transistor coupled between the swinging node and a circuit ground, said first and second transistors arranged to switchably direct currents through said inductor and said output capacitor to thereby generate an output voltage across said output capacitor; and
    a controller, including a hysteretic comparator and a pulse-width modulation (PWM) comparator, said controller having at least first and second operational modes, wherein in the
        first operational mode, the controller is operable to switch said first and second transistors according to an output signal from said PWM comparator, said output signal based on an error voltage that indicates a difference between said output voltage and a predetermined voltage, and in the
        second operational mode, said controller is operable to turn off said PWM comparator and turn off switching of said first and second transistors when the magnitude of said error voltage drops below the magnitude of a first threshold voltage and return to said first operational mode, in response to a turn-on signal from said hysteretic comparator, when the magnitude of said error voltage rises above the magnitude of a second threshold voltage.

2. The voltage regulator of claim 1, wherein the magnitude of said second threshold voltage exceeds the magnitude of said first threshold voltage.

3. The voltage regulator of claim 2, wherein said controller is configured to temporarily turn on said first transistor when the magnitude of said error voltage rises above the magnitude of said second threshold voltage.

4. The voltage regulator of claim 2, wherein said controller is configured to cause the magnitude of said second threshold voltage to momentarily increase when the magnitude of said error voltage drops below the magnitude of said first threshold voltage and to cause the magnitude of said first threshold voltage to momentarily decrease when the magnitude of said error voltage rises above the magnitude of said second threshold voltage.

5. The voltage regulator of claim 2, comprising a feedback loop that includes said hysteretic comparator, said feedback loop operable to generate said error voltage and switch said first and second transistors, wherein said hysteretic comparator comprises a switch network arranged to couple said first threshold voltage to a second input port of said first comparator in response to said first comparator and to couple said second threshold voltage to said second input port in response to said inverter.

6. The voltage regulator of claim 2, wherein said controller includes a hysteretic comparator that comprises:
    a differential pair of first and second transistors to receive said error voltage with said first transistor and to bias said second transistor with said first threshold voltage;
    a third transistor;
    a switch arranged to couple said third transistor in parallel with said second transistor to thereby modify said first threshold voltage to said second threshold voltage;
    an inverter driven by said differential pair and coupled to drive said switch;
    a fourth transistor arranged to drive said inverter in response to said differential pair; and
    a capacitor coupled to drive said fourth transistor in response to said inverter.

7. The voltage regulator of claim 1, wherein said inductor, said output capacitor and said first and second transistors are arranged to form a selected one of a buck output stage, a boost output stage and a buck-boost output stage.

8. A voltage regulator, comprising:
    an output stage having an inductor, an output capacitor, and first and second transistors, the first and second transistors arranged in series to switchably direct currents through said inductor and said output capacitor to thereby generate an output voltage across said output capacitor; and
    a controller configured to:
        in a first operational mode, switch said first and second transistors with a duty cycle determined by an error voltage that indicates a difference between said output voltage and a predetermined voltage; and
        in a second operational mode, turn off switching of said first and second transistors when the magnitude of said error voltage drops below the magnitude of a first threshold voltage and, when the magnitude of said error voltage rises above the magnitude of a second threshold voltage that exceeds the magnitude of said first threshold voltage, temporarily turn on said first transistor and subsequently return said first and second transistors to said first operational mode.

9. The voltage regulator of claim 8, wherein said controller is configured to cause the magnitude of said second threshold voltage to momentarily increase when the magnitude of said error voltage drops below the magnitude of said first threshold voltage and to cause the magnitude of said first threshold voltage to momentarily decrease when the magnitude of said error voltage rises above the magnitude of said second threshold voltage.

10. The voltage regulator of claim 8, wherein said controller includes a feedback loop configured to generate said error voltage and further includes a hysteretic comparator that comprises:
    a comparator to receive said error voltage at a first input port of said comparator;
    an inverter driven by said comparator and adapted to turn off or on switching of said first and second transistors;
    a switch network arranged to couple said first threshold voltage to a second input port of said comparator in response to said comparator and to couple said second threshold voltage to said second input port in response to said inverter; and a capacitor coupled to said second input port and arranged to be driven by said inverter.

11. The voltage regulator of claim 8, wherein said controller includes a hysteretic comparator that comprises:
a differential pair of third and fourth transistors to receive said error voltage with said third transistor and to bias said fourth transistor with said first threshold voltage;
a fifth transistor;
a switch arranged to couple said fifth transistor in parallel with said fourth transistor to thereby modify the effect of said threshold voltage to that of a second threshold voltage;
an inverter driven by said differential pair and coupled to drive said switch;
a sixth transistor arranged to drive said inverter in response to said differential pair; and
a capacitor coupled to drive said sixth transistor in response to said inverter.

12. The voltage regulator of claim 8, wherein said inductor, said output capacitor and said first and second transistors are arranged to form a selected one of a buck output stage, a boost output stage and a buck-boost output stage.

13. A hysteretic comparator, comprising:
a differential pair of first and second transistors to receive an error voltage with said first transistor and to bias said second transistor with a first threshold voltage;
a third transistor;
a switch arranged to couple said third transistor in parallel with said second transistor to thereby modify the effect of said first threshold voltage to that of a second threshold voltage of greater magnitude;
an inverter driven by said differential pair and coupled to drive said switch;
a fourth transistor arranged to drive said inverter in response to said differential pair; and
a capacitor coupled to drive said fourth transistor in response to said inverter.

14. The hysteretic comparator of claim 13, further including a fifth transistor inserted to drive said inverter in response to said fourth transistor.

15. The hysteretic comparator of claim 13, further including a second inverter driven by said inverter.

16. The voltage regulator of claim 1, wherein said hysteretic comparator includes a first comparator, an inverter, and a charge storing element, wherein an output port of said first comparator is coupled to an input port of said inverter, wherein said charge storing element is coupled between an output port of said inverter and a first input port of said first comparator, and wherein said output port of said inverter provides said turn-on signal.

17. The voltage regulator of claim 8, comprising a hysteretic comparator, wherein said controller is operable to enter said first operational mode in response to a turn-on signal from said hysteretic comparator.

18. The voltage regulator of claim 17, wherein said controller is operable to temporarily turn on said first transistor in response to said turn-on signal from said hysteretic comparator and before entering said first operational mode.

19. The voltage regulator of claim 17, wherein said hysteretic comparator includes a capacitive feedback loop that influences an AC hysteresis characteristic of the hysteretic comparator.

20. The hysteretic comparator of claim 13, wherein the capacitor influences an AC hysteresis characteristic of the hysteretic comparator.

* * * * *